US010657784B1

(12) United States Patent
Gordon et al.

(10) Patent No.: US 10,657,784 B1
(45) Date of Patent: May 19, 2020

(54) AUXILIARY MOTION DETECTOR FOR VIDEO CAPTURE

(71) Applicant: Amazon Technologies, Inc., Seattle, WA (US)

(72) Inventors: Stephen E. Gordon, Lexington, MA (US); Douglas Mark Chin, Windham, NH (US); Peter Douglas Besen, Somerville, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/978,860

(22) Filed: May 14, 2018

(51) Int. Cl.
G08B 13/196 (2006.01)
H04N 7/18 (2006.01)

(52) U.S. Cl.
CPC ... *G08B 13/19695* (2013.01); *G08B 13/1966* (2013.01); *H04N 7/188* (2013.01)

(58) Field of Classification Search
CPC .......... G08B 13/1966; G08B 13/19695; H04N 7/188
See application file for complete search history.

(56) References Cited

U.S. PATENT DOCUMENTS

| 4,087,814 A * | 5/1978 | Spirig ..................... G01S 13/56 340/554 |
| 4,710,750 A * | 12/1987 | Johnson ................. G08B 13/19 340/522 |
| 6,160,544 A * | 12/2000 | Hayashi ................. H04H 40/18 348/E5.022 |
| 8,314,390 B2 | 11/2012 | Micko |
| 9,569,953 B2 | 2/2017 | Micko |
| 9,906,722 B1 | 2/2018 | Gigot |
| 9,911,319 B2 | 3/2018 | Malhotra et al. |
| 2007/0063840 A1 * | 3/2007 | Jentoft ............. G08B 13/19697 340/541 |
| 2007/0297438 A1 * | 12/2007 | Meylan ............. H04W 52/0225 370/445 |

(Continued)

FOREIGN PATENT DOCUMENTS

| DE | 10 2013 103 002 | * | 3/2013 | ............. G01S 13/56 |
| DE | 102013103002 A1 | * | 9/2014 | ............. G01S 13/56 |

OTHER PUBLICATIONS

Author Unknown; The Beginner's Guide to Motion Sensors; Safe Wise; 2013; 13 pgs.

(Continued)

*Primary Examiner* — Robert J Hance
(74) *Attorney, Agent, or Firm* — K&L Gates LLP

(57) ABSTRACT

Techniques are generally described for controlling a camera to capture video based on one or more auxiliary motion sensors. First data indicative of motion may be received from a first motion sensor at a camera. In some examples, the first motion sensor may have a first field-of-view. Second data indicative of motion may be received from a second motion sensor at the camera device. In some examples, the second motion sensor may have a second field-of-view different than the first field-of-view. A determination may be made that the first data temporally corresponds to the second data. In some examples, an image sensor of the camera may capture first image data in response to the first data indicative of motion and the second data indicative of motion.

17 Claims, 6 Drawing Sheets

(56) References Cited

U.S. PATENT DOCUMENTS

| | | | | |
|---|---|---|---|---|
| 2010/0302090 A1* | 12/2010 | Wu | .................... | G08B 13/2494 |
| | | | | 342/160 |
| 2013/0215266 A1* | 8/2013 | Trundle | ........... | G08B 13/19602 |
| | | | | 348/143 |
| 2014/0003406 A1* | 1/2014 | Kamath | .................... | G01S 5/14 |
| | | | | 370/338 |
| 2014/0028473 A1* | 1/2014 | Ryan | ...................... | G01R 33/10 |
| | | | | 340/907 |
| 2016/0105847 A1* | 4/2016 | Smith | ................... | H04L 67/125 |
| | | | | 370/252 |
| 2016/0300479 A1* | 10/2016 | Modi | ................... | G08B 29/188 |

OTHER PUBLICATIONS

Wikipedia contributors; "Passive Infrared Sensor"; *Wikipedia, The Free Encyclopedia*; Apr. 16, 2018, Retrieved from https://en.wikipedia.org/w/index.php?title=Passive_infrared_sensor on May 1, 2018; 6 pgs.

* cited by examiner

AUXILIARY MOTION DETECTOR FOR VIDEO CAPTURE

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository. In various examples, cameras may include infra-red light sources in order to capture image data and/or video data in low light conditions.

DETAILED DESCRIPTION

Figure 1:
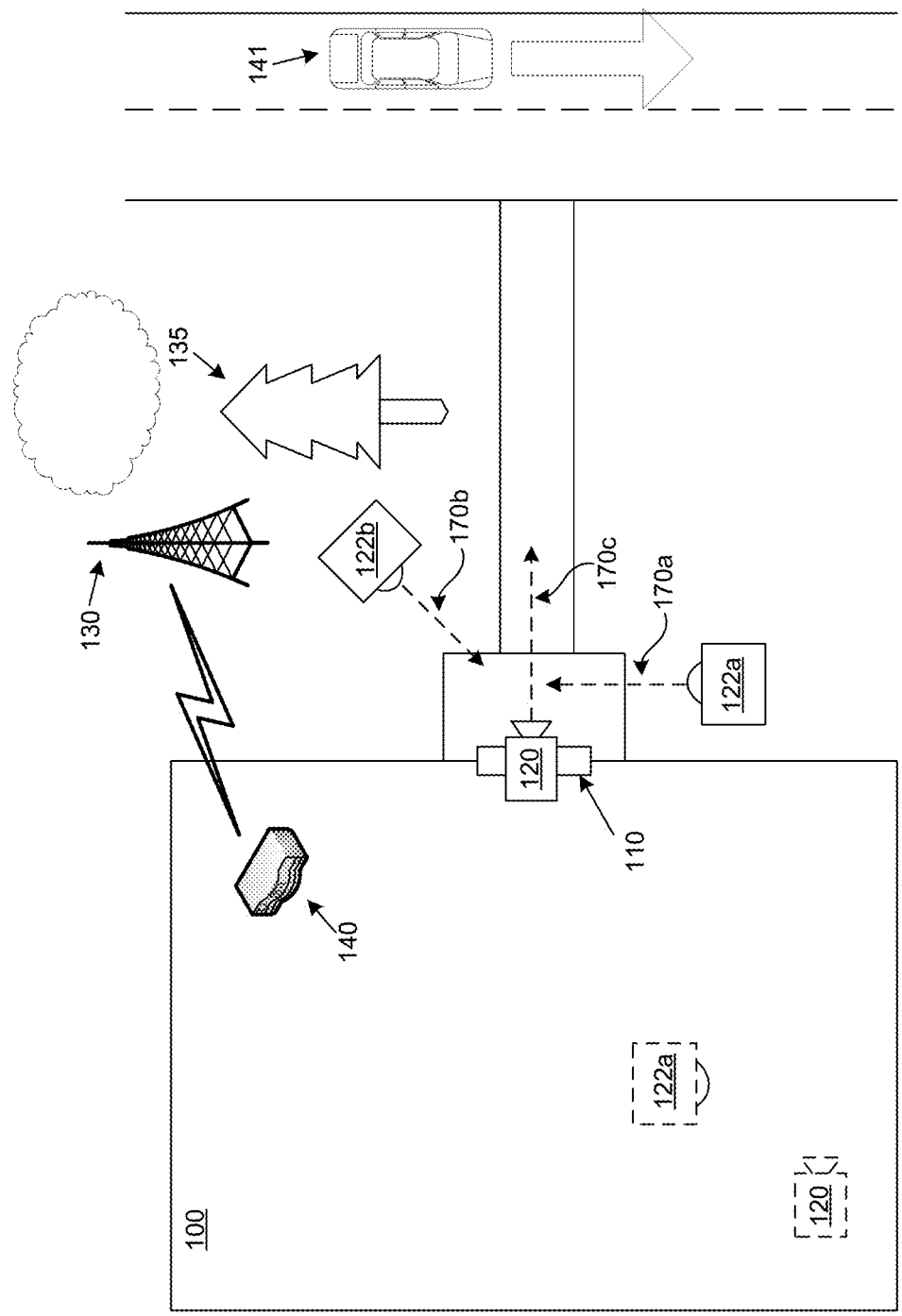
FIG. 1 is a diagram illustrating a building monitored by a camera device with auxiliary motions sensors, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system. In various examples, camera devices may be battery-powered for ease of installation and to avoid unsightly power cords. In various other examples, camera devices may be powered through a wired interface (e.g., through a wall socket). In at least some examples, camera devices may include motion sensors to detect motion. In some examples, upon detection of motion, a camera device may begin capturing and/or streaming video to one or more other devices (e.g., video processing device 140) for storage, display, and/or processing. Advantageously, waiting until motion is detected prior to capturing and/or streaming image data and/or video data may prolong battery life (and minimize power consumption) by capturing video only when movement is detected. In many cases, and particularly in a surveillance context, video segments that do not depict movement may not be of sufficient interest to a user of the camera system to warrant continuous video capture and/or streaming, particularly given that continuous video capture results in a quicker consumption of battery power and more frequent battery replacement. In various examples, video data may refer to one or more sequential frames of image data.

In some examples, insignificant motion may trigger a motion sensor of a camera device, which may, in turn, cause the camera device to begin capturing and/or streaming video even though the video may not be of interest to a user. Accordingly, it may be beneficial to limit the number of such "false positives" where insignificant motion results in video capture and/or streaming, which, in turn, may lead to increased power consumption and depletion of battery power. For example, an outdoor camera device may include a motion sensor with a "field-of-view" (e.g., the area monitored by the motion sensor) that includes a tree outside of a user's home. In the example, the motion sensor may be triggered each time that the wind blows and the leaves of the tree are rustled. The triggering of the motion sensor may, in turn, cause the camera device to capture and/or stream video. In another example, a motion sensor may be triggered each time a pet moves within the field-of-view (FOV) of the motion sensor. In another example, a motion sensor may be triggered by cloud movement and sunlight changes due to passing clouds. Various systems and techniques described herein may be effective to prevent triggering of video capture and/or streaming due to inconsequential motion that is not likely to be of interest to a user.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor. PIR sensors often include two sensor "halves" and/or multiple sensor regions. A multi-facet lens breaks light received from a scene into multiple regions and projects these regions on to the different halves or regions of the sensor. The sensor integrates the black body radiation detected in the two halves (or in the multiple regions, depending on the sensor) and determines the differential change. The differential change is the difference in detected radiation between the two sensor halves (or between the different regions). If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by the sensor. Accordingly, PIR sensors consume relatively little power when in use.

In various examples, if motion is detected in an environment monitored by a motion sensor such as a PIR sensor, the triggered motion sensor may send a signal to one or more camera devices associated with the motion sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may be configured to begin capturing video. In various examples, the camera device may include a wireless and/or a wired transmitter and may send the captured video (e.g., may "stream" the video) to one or more other devices for playback, processing, and/or storage. For example, the camera device may stream the video to a mobile device of a user associated with the building and/or the room of the building. In some other examples, the camera device may send the video to a central processing device that may be effective to take one or more actions such as storing the video data in one or more memories, processing the video data, sending the video data to one or more other devices, and/or sending an indication or alert indicating that motion has been detected in the environment monitored by the camera device and/or providing optional access to video captured by the camera device. In various examples, the central processing device may be located within the same building or grouping of buildings as the camera device(s); however, in some other examples, the central processing device may be remotely located from the camera device(s) and may communicate with the camera device(s) over a wide area network (WAN) such as the Internet.

In at least some examples, motion sensors, such as PIR sensor(s), may be integrated into a housing of the camera device(s). In various examples, integrated PIR sensors may be referred to as primary PIR sensors, or more generally, primary motion sensors. However, in other examples, motion sensors may be separate from the camera device(s) and may communicate with the camera device(s) and/or with a central processing device configured in communication with the camera(s) using a wired and/or a wireless communication technology. For example, the PIR sensor(s) may communicate with the camera device(s) and/or with a central processing device via a short-range communication protocol such as Bluetooth® or Bluetooth® Low Energy (BLE). In various other examples, the PIR sensor(s) may communicate with the camera device(s) and/or with a central processing device using a wireless local area network (WLAN) using, for example, a version of the IEEE 802.11 standard.

In at least some examples, the PIR sensor(s) and/or the camera device(s) may be battery powered. However, in some examples, the PIR sensor(s) and/or the camera device(s) may be battery powered and/or powered using a wired connection to a power source (e.g., a wall socket). In various examples, a central processing device (or multiple central processing devices) may be effective to communicate with the camera device(s) using a wired and/or wireless connection. For example, the central processing device may communicate with the camera device(s) using a wireless network such as a WLAN via the 900 MHz band. In some examples, the central processing device and/or the camera devices may be effective to receive user requests (e.g., from a user mobile device and/or from a companion application on a user mobile device) to access image data and/or video data that is accessible via the central processing device and/or to cause one or more camera devices to begin capturing and/or streaming video. For example, the central processing device may receive a request from a mobile device (e.g., a mobile device authenticated to the central processing device) for particular video data captured by a particular camera device at a particular time. In the example, the central processing device may stream the video to the authenticated mobile device. In some other examples, an authenticated mobile device may request a live video feed from one or more camera device(s). In the example, the central processing device may be effective to control the relevant camera device(s) to begin capturing video data. The central processing device may be effective to have the relevant camera device(s) stream the video data to the requesting mobile device. In other embodiments, the relevant camera device(s) may send the video data to the central processing device which may, in turn, stream the video to the requesting mobile device (after video processing, for example). In at least some examples, the central processing device may be powered by a wired connection to a wall outlet or other power source. In other examples, an authenticated mobile device may communicate directly with the one or more camera devices.

In accordance with various systems and techniques described herein, one or more auxiliary motion sensors may be used to determine whether motion detected in the physical environment is likely to be of interest to a user or, conversely, whether motion is likely to be inconsequential and should therefore be ignored. In various examples, if a motion sensor integrated within the housing of a camera device detects motion, but an auxiliary motion sensor monitoring the same general area of the environment as the camera device—albeit from a different field-of-view—does not detect motion, a determination may be made that the triggering event is inconsequential and the camera device may not begin capturing video. In some examples, multiple auxiliary motion sensors may be used. A user of the various camera systems described herein may configure a sensitivity of the group of auxiliary motion sensors by, for example, selecting a number of auxiliary motion sensors to be triggered prior to capturing video. The auxiliary motion sensors may communicate using a time-synchronized wireless network. When an auxiliary motion sensor detects motion, the auxiliary motion sensor may transmit a signal indicating that motion has been detected. In some examples, the signal may further comprise a timestamp, indicating a time and/or a timeframe at which the motion was detected. The camera device may be effective to determine that the motion detected by the one or more auxiliary sensors corresponds to motion detected by the integrated motion sensor based on timestamp data. For example, the camera device may determine (e.g., using the timestamp) that the motion event was closely time-related to motion events detected by one or more other motion sensors (e.g., other auxiliary motion sensors and/or integrated motion sensors of the camera device). The camera device may be configured to initiate video data, image data, and/or audio data capture in response to detection of the closely time-related motion by the auxiliary motion sensor and the one or more other motion sensors. In various examples, the camera device may initiate image data capture and/or video data capture by activating an image sensor of the camera device. Similarly, in various examples, the camera device may initiate audio data capture by activation of audio electronics of the camera device. Prior to initiation of image data capture and/or video data capture, an inactive state of the motion sensor (e.g., a stand by mode, low power mode, or powered off mode) may be maintained until such time as a processor of the camera device activates the image sensor to capture image data and/or video data. When activated to capture image data and/or video data, the image sensor may consume more power relative to the inactive state.

Additionally, in some examples, first motion sensor(s) (or group of motion sensors) having a first field-of-view (or fields-of-view) may trigger video, image, and/or audio capture at a first time (e.g., a first time of day) and a second motion sensor (or group of motion sensors) having a second field-of-view (or fields-of-view) may trigger video, image, and/or audio capture at a second time (e.g., a second time of day). For example, a first PIR sensor positioned with a first field-of-view may be used to trigger video capture during the morning hours when the sun is in a first position. Later in the day, when the sun is in a second position, a second PIR sensor with a different field-of-view relative to the first PIR sensor may be used to trigger video capture. Additionally, one or more groups of motion sensors may be configured to trigger video, audio, and/or image data capture. The groups of one or more motion sensors used to trigger motion may be configurable by a user and/or based on device settings.

FIG. 1 is a diagram illustrating a building 100 (e.g., a residential building) with a camera device 120 installed in a front door 110 of the building 100. In the example of FIG. 1, the camera device 120 may be positioned so as to have a field-of-view that depicts a walkway leading to front door 110 as well as a front porch so that the camera device 120 may capture image data and/or video data of persons approaching the front door 110. In the example of FIG. 1, camera device 120 may be battery-powered. Additionally, camera device 120 may comprise a motion sensor (e.g., a PIR sensor or other motion sensor). The motion sensor of camera device 120 may have a field-of-view that is approximately equivalent to the field-of-view of the image sensor of camera device 120. Accordingly, the motion sensor may detect motion along the porch, walkway, and in the front yard of building 100.

If camera device 120 were configured such that detection of motion by the integrated motion sensor alone triggered video capture and/or image capture, camera device 120 may capture and/or stream a significant amount of inconsequential image and/or video data resulting from inconsequential motion detected by the integrated motion sensor. For example, if the integrated motion sensor is a PIR sensor, the PIR sensor may be triggered by sunlight filtering through the leaves of tree 135 as the tree blows in the wind. Additionally, as camera device 120 and the integrated PIR sensor face a street, the PIR sensor may be triggered by each passing vehicle on the street. Accordingly, the battery of camera device 120 may be drained at an increased rate due to video capture of inconsequential movement.

In various examples, camera device 120 may be positioned inside building 100 to monitor a portion of the interior of building 100. In such examples, if camera device 120 were configured such that detection of motion by an integrated motion sensor with a field-of-view that is substantially (e.g., within +/−5°, 10° or some other amount) aligned with the field-of-view of the image sensor was effective to trigger video capture and/or image capture, camera device 120 may capture and/or stream a significant amount of inconsequential image and/or video data. For example, movement of fans, pets, curtains blowing in the wind, changes in lighting, etc., may trigger the motion sensor. Accordingly, a battery of camera device 120 may be drained at a relatively rapid rate and may require frequent replacement. Additionally, unwanted and/or uninteresting video and/or image data may be sent to a user of camera device 120 resulting from the triggering of the motion sensor. Additionally, numerous alerts and/or notifications may be sent to a user of camera device 120 related to the detected motion. A user may become annoyed and/or desensitized through the receipt of a large number of notifications and/or results related to uninteresting motion (e.g., pet movement, lighting changes, etc.). Accordingly, in various examples, it may be desirable to limit video and/or image data capture to instances where motion that is likely to be of interest to a user is present within the field-of-view of the image sensor. Additionally, limiting video and/or image capture and/or video streaming to such instances may significantly prolong battery life and reduce power consumption. In some examples, battery-powered cameras designed and/or operating in accordance with the various techniques described herein may have battery lives of upwards of 2+ years, while battery-powered cameras that stream and/or capture video data upon all detected motion may have battery lives on the order of weeks to months.

Accordingly, in some examples, one or more auxiliary motion sensors may be used to monitor an area of interest for motion. For example, in FIG. 1, auxiliary motion sensors 122a and 122b are shown. Although FIG. 1 depicts two auxiliary motion sensors, more or fewer auxiliary motion sensors may be used in accordance with the various embodiments described herein. In the example of FIG. 1, the auxiliary motion sensor 122a and/or 122b may be PIR sensors, although any other type of motion sensor may be used in accordance with the present disclosure. Additionally, in at least some examples, auxiliary motion sensors 122a and/or 122b may be integrated within camera devices.

Auxiliary motion sensors 122a and/or 122b may be positioned so as to have a field-of-view that at least partially overlaps with a field-of-view of the image sensor of camera device 120. In the example depicted in FIG. 1, the image sensor of camera device 120 may have a field-of-view that includes the front porch of building 100. Similarly, auxiliary sensors 122a and 122b may have fields-of-view that include the front porch of building 100. However, a central axis of the field-of-view of auxiliary motion sensors 122a and/or 122b may differ from a central axis of the field-of-view of the image sensor of camera device 120. In various examples, a "central axis" may refer to an optical axis of a lens of a camera device and/or a motion sensor. In the example depiction in FIG. 1, the central axis 170c of the field-of-view of image sensor of camera device 120 is approximately orthogonal to the central axis 170a of the field-of-view of auxiliary motion sensor 122a. Further, in the example depiction in FIG. 1, the central axis 170b of the field-of-view of auxiliary motion sensor 122b is at an approximately 135° angle with respect to the central axis 170c of the image sensor of camera device 120. Additionally, in the example of FIG. 1, auxiliary sensor 122b has a field-of-view that is facing towards building 100 while the field-of-view of the image sensor of camera device 120 faces outward, away from building 100. In at least some examples, it may be beneficial that the central axis of at least one of the auxiliary motion sensors is offset from a central axis of an integrated motion sensor of camera device 120 by an angle of at least 10°. As used herein, motion sensors may have different or differing fields-of-view based on different viewing angles of the motion sensors and/or based on different view directions of the motion sensors. For example, a first motion sensor may have a field-of-view (e.g., a first viewing angle) of 65° and may be oriented North. A second motion sensor may also have a field-of-view (e.g., a second viewing angle) of 65° but may be oriented West. In the example, the two motion sensors may be described as having "different fields-of-view" since the direction of the orientation of the two motion sensors is different.

In various examples, when an auxiliary motion sensor detects motion, the auxiliary motion sensor may send a signal to one or more camera devices with which the auxiliary motion sensor is associated. Various signal transmission techniques are described in further detail below. In some examples, camera device 120 may be configured such that camera device 120 may initiate capture of image and/or video data upon determining that both an internal motion sensor of camera device 120 and one or more auxiliary motion sensors have detected motion. Similarly, in various examples, camera device 120 may be configured such that camera device 120 may initiate streaming of image data and/or video data upon determining that both an internal motion sensor of camera device 120 and one or more auxiliary motion sensors have detected motion.

In at least some examples, camera device 120 may not include a motion sensor. In such examples, camera device 120 may be configured such that camera device 120 may initiate video capture and/or streaming upon determining that one or more auxiliary motion sensors have detected motion. The number of motion sensors (auxiliary and/or integrated) that are used to detect motion prior to initiation of video/image capture and/or streaming may be user configurable. For example, a user may set a threshold that detection of motion by each of the integrated motion sensor of camera device 120, the auxiliary motion sensor 122b, and the auxiliary motion sensor 122a within a predetermined and/or configurable time period triggers the initiation of video/image capture and/or streaming by camera device 120. In various examples, auxiliary motion sensors (e.g., motion sensor 122a and/or 122b) may generate timestamp data indicating a time at which motion has been detected by the sensors. Such timestamp data may be transmitted along with signals indicating motion to camera device 120. Camera device 120 may be effective to receive the signals and may determine whether or not the motion detected by the motion sensors is closely time-related (e.g., within 0.1 s or any other suitable amount of time). If the auxiliary motion sensors 122a and/or 122b are determined to have detected closely time-related motion and the time is closely related to a time at which a motion sensor of camera device 120 has detected motion, camera device 120 may begin capturing video data, audio data, and/or image data. In some other examples, a user may set a threshold that an integrated motion sensor of camera device 120 and at least one of auxiliary motion sensor 122a and auxiliary motion sensor 122b have detected motion within a predetermined and/or configurable time period in order to initiate video/image capture and/or streaming by camera device 120.

In yet another example, camera device 120 may have an integrated motion sensor. Only a single auxiliary motion sensor (e.g., auxiliary motion sensor 122a) may be used in conjunction with camera device 120. In such an example, a user may configure the camera system such that both the integrated motion sensor of camera device 120 and the auxiliary motion sensor 122a detect motion during a predetermined and/or configurable time period in order to initiate video/image capture and/or streaming by camera device 120.

The various example systems described above may reduce power consumption by camera device 120 and reduce the amount of "false positive" video capture (e.g., video that represents motion that is unlikely to be of interest to a user). For example, as car 141 drives along the road in front of building 100, an integrated motion sensor of camera device 120 may detect motion due to the movement of the car. However, because the field-of-view of auxiliary motion sensor 122a is not directed toward the road, auxiliary motion sensor 122a may not detect motion due to the passing car 141. Camera device 120 may be configured such that the integrated motion sensor of camera device 120 and the auxiliary motion sensor 122a detect motion prior to capturing video data. As auxiliary motion sensor 122a has not been triggered (e.g., has not detected motion), auxiliary motion sensor 122a will not send a signal to camera device 120 indicating motion. As such, camera device 120 may not initiate video capture in the current example. Accordingly, the false positive scenario (e.g., video capture due to the passing car) has been avoided, conserving battery power and avoiding the sending of a notification to a user alerting the user to motion that is unlikely to be of interest (e.g., the movement of a car passing in front of building 100).

In yet another example, as sunlight filters through the leaves of tree 135 and the wind rustles the leaves of tree 135, an integrated motion sensor of camera device 120 may be triggered. In the current example, the field-of-view of auxiliary motion sensor 122a may encompass a part of tree 135. Accordingly, auxiliary motion sensor 122a may also be triggered by the movement of tree 135. However, auxiliary motion sensor 122b has a field-of-view that is directed away from tree 135. As such, auxiliary motion sensor 122b may not be triggered by the movement of the tree 135. In the current example, camera device 120 may be configured such that the integrated motion sensor of camera device 120, auxiliary motion sensor 122a, and the auxiliary motion sensor 122b each detect motion prior to capturing video data. As auxiliary motion sensor 122b has not been triggered (e.g., has not detected motion), auxiliary motion sensor 122b will not send a signal to camera device 120 indicating motion. As such, as camera device 120 has not received a "triggered" signal from the integrated motion sensor, auxiliary sensor 122a, and auxiliary sensor 122b, camera device 120 may not initiate video capture. Accordingly, the false positive scenario (e.g., video capture due to the wind blowing tree 135) has been avoided, conserving battery power and avoiding the sending of a notification to a user alerting the user to motion that is unlikely to be of interest (e.g., the wind blowing the leaves of a tree in front of building 100).

In another example, camera device 120 may be positioned so as to monitor a portion of the interior of building 100. In the example, auxiliary motion sensor 122a may be positioned so as to have a field-of-view that is substantially different from the field-of-view of camera device 120. However, the fields-of-view of camera device 120 and auxiliary motion sensor 122a may both cover an area-of-interest within building 100. In the current example, camera device 120 may have an integrated PIR sensor and auxiliary motion sensory 122a may be an auxiliary PIR sensor. Camera device 120 may be configured such that both the integrated PIR sensor and the auxiliary PIR sensor (e.g., sensor 122a) are triggered prior to initiating video capture and/or streaming by camera device 120. In the current example, a dog or other house pet may reside within building 100. Each time the dog passes within the area-of-interest that is within the fields-of-view of both camera device 120 and auxiliary motion sensor 122a, the camera device may begin capturing and/or streaming video. Accordingly, to avoid such a scenario, the auxiliary motion sensor 122a may be positioned such that the field-of-view of auxiliary motion sensor 122a has a lower boundary that is above the height of the dog. For example, camera device 120 may be positioned in an upper corner of a room and angled downward. Auxiliary motion sensor 122a, by contrast, may be placed on a wall at a height that is above the height of the dog (e.g., 1 foot above the dog's height, or some other suitable distance above the dog's height) and angled upward such that the field-of-view of the auxiliary motion sensor 122a is not likely to capture the dog. Accordingly, when the dog passes through the area-of-interest, the integrated PIR sensor of camera device 120 may be triggered, but the auxiliary PIR sensor (e.g., auxiliary motion sensor 122a) may not be triggered. Accordingly, the false positive scenario (e.g., video capture due to the passing dog) has been avoided, conserving battery power and avoiding the sending of a notification to a user alerting the user to motion that is unlikely to be of interest (e.g., the dog passing through the area-of-interest in building 100).

In at least some examples, a user may wish to keep camera device 120 inside building 100, but may wish to monitor a portion of the environment outside of building 100. For example, camera device 120 may be positioned to behind a window or other glass of building 100 to capture image data of the front porch and/or walkway of building 100. In some examples, a user may wish to keep camera device 120 inside building 100 to prevent theft, vandalism, overheating due to direct sunlight, etc. In such an example, a PIR sensor of camera device 120 may be ineffective to detect motion occurring outside of building 100 as various infrared signals (e.g., body heat of a human) may have a wavelength that is blocked by glass. Accordingly, in such an example, one or more auxiliary motion sensors (e.g., auxiliary motion sensors 122a, 122b) may be positioned outside and the system may be configured to trigger capture of image data by camera device 120 when one or more of the outdoor auxiliary motion sensors 122a, 122b detect motion.

In at least some examples, the number of motion sensors that detect motion prior to initiation of video, image, and/or audio capture may be different during different times of day and/or during different weather conditions. For example, during morning hours (e.g., from 7 am to 11 am) the lighting conditions for a auxiliary motion sensor 122a may be such that false positive triggering of the particular auxiliary motion sensor 122a is unlikely. Accordingly, a processor of the camera device may be operable to determine that during the morning hours from 7 am to 11 am, video capture by an image sensor of camera device 120 may be triggered based on motion being detected by auxiliary motion sensor 122a without requiring motion to be detected by auxiliary motion sensor 122b and/or an integrated motion sensor of camera device 120. In another example, during the evening hours (e.g., 5 pm to 8 pm) the lighting conditions for an integrated motion sensor of camera device 120 may be such that false positive triggering of the integrated motion sensor is unlikely. Accordingly, a processor of the camera device 120 may be operable to determine that during the evening hours from 5 pm to 8 pm, video capture by an image sensor of camera device 120 may be triggered based on motion being detected by the integrated motion sensor of camera device 120 without requiring motion to be detected by any auxiliary motion sensors. In at least some examples, at least one processor of camera device 120 and/or of video processing device 140 may determine particular configurations of motion sensors that are to be used to trigger video capture during particular times of day based on lighting conditions and/or based on the number of false positive motion events detected.

Figure 2:
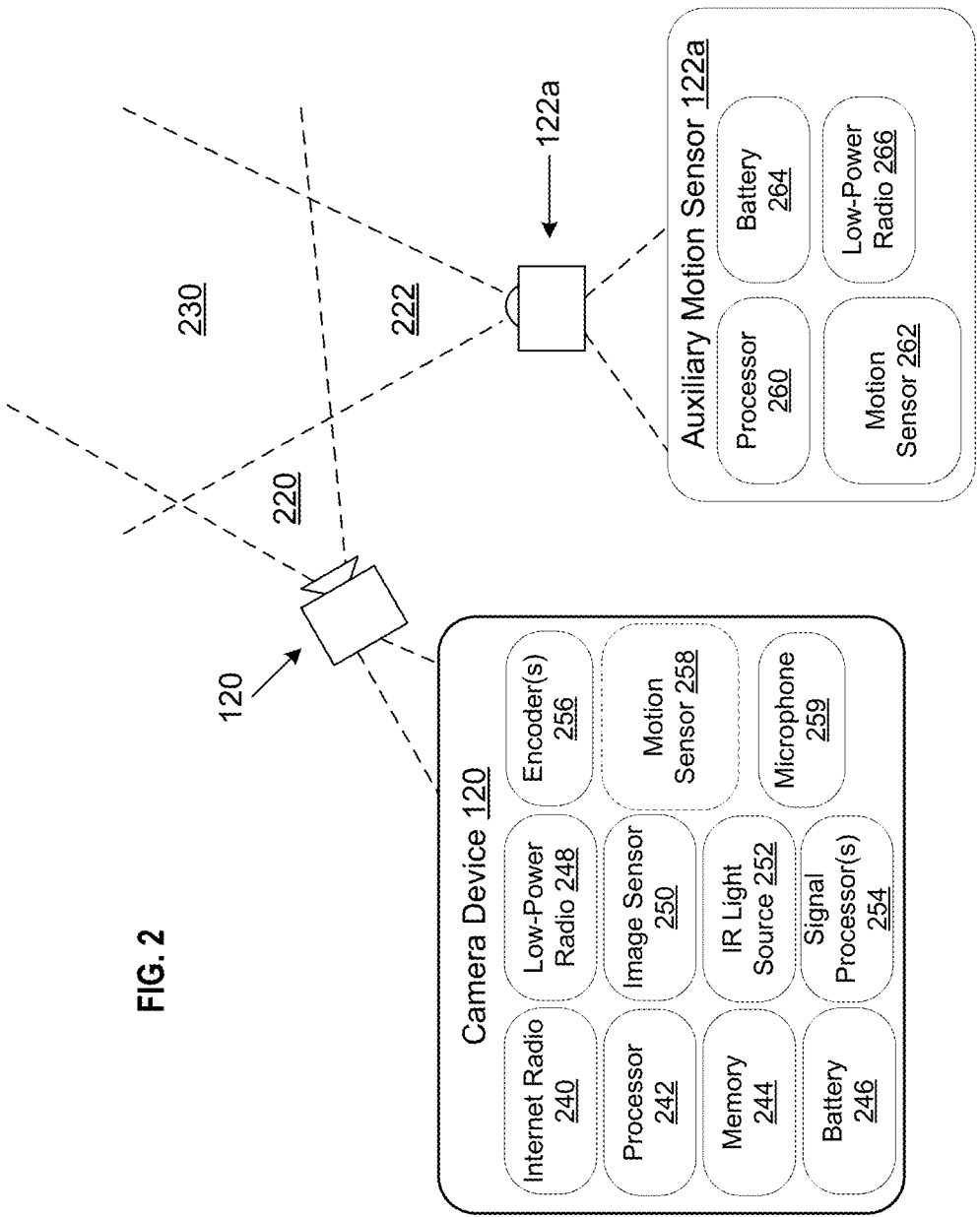
FIG. 2 depicts fields-of-view of a camera device and an auxiliary motion sensor, in accordance with various embodiments of the present disclosure.

FIG. 2 depicts example fields-of-view of camera device 120 and auxiliary motion sensor 122a, in accordance with various aspects of the present disclosure. In FIG. 2, camera device 120 has a field-of-view 220. In the example of FIG. 2, the fields-of-view of image sensor 250 and motion sensor 258 of camera device 120 may be substantially aligned such that field-of-view 220 represents the field-of-view of both the image sensor 250 and motion sensor 258. Auxiliary motion sensor 122a may have a field-of-view 222. As depicted in FIG. 2, the field-of-view 220 of camera device 120 and the field-of-view 222 of auxiliary motion sensor 122a may overlap at overlap region 230. In various examples, camera device 120 and auxiliary motion sensor 122a may be positioned such that overlap region 230 covers an area-of-interest (e.g., an area that a user desires to monitor with camera device 120).

Camera device 120 is described below. In various examples, camera device 120 may include additional components apart from what is shown. Additionally, in various examples, one or more components of camera device 120 depicted in FIG. 2 may be omitted. Accordingly, the camera device 120 depicted in FIG. 2 is provided by way of example only. In various examples, camera device 120 may comprise an internet radio 240 (e.g., a WiFi radio). In various examples, camera device 120 may use internet radio 240 to send capture video data, image data, and/or audio data (e.g., captured by microphone 259) to one or more other computing devices for display, storage, and/or processing. For example, camera device 120 may use internet radio 240 to send video data to video processing device 140. Video processing device 140 may, in turn, send video data, image data, and/or audio data received from camera device 120 to one or more other computing devices. For example, video processing device 140 may send video data to a mobile device of a user via base station 130 (depicted in FIG. 1).

Camera device 120 may further comprise one or more processors. For example, camera device may comprise processor 242. Additionally, camera device 120 may comprise a computer-readable non-transitory memory 244. In various examples, the memory 244 may store instructions that may be executed by the processor to cause the processor to be operable to perform one or more of the operations described herein. Camera device 120 may comprise a battery 246. Battery 246 may be a lithium-ion battery, a nickel cadmium battery, or any other suitable type of battery. In various other examples, camera device 120 may be powered via an external power source. Camera device 120 may further comprise an image sensor 250 effective to capture image and video data. In various examples, image sensor 250 may be a complimentary metal oxide semiconductor (CMOS) sensor or a charge-coupled device (CCD) image sensor.

In various further examples, camera device 120 may comprise an infrared (IR) light source 252. IR light source 252 may be effective to emit infrared light to allow camera device 120 to capture image data and/or video data in low ambient light conditions. In various examples, camera device 120 may comprise one or more signal processor(s) 254 effective to process image signals generated by the image sensor 250 and/or effective to process audio signals generated by microphone 259 and/or associated audio electronics of camera device 120. In some further examples, camera device 120 may comprise one or more encoders 256 effective to encode image data, video data, and/or audio data into various formats for transmission, playback, and/or further processing. In some further examples, camera device 120 may include a motion sensor 258. Motion sensor 258 may be a PIR sensor, a microwave sensor, an ultrasonic motion sensor, etc.

In at least some examples, camera device 120 may comprise a low-power radio 248. In at least some examples, camera device 120 may use low-power radio 248 to communicate with one or more auxiliary motion sensors (e.g., auxiliary motion sensors 122a, 122b, etc.). In various examples, low-power radio 248 may have a relatively short range (e.g., <100 ft, <200 ft, <60 ft, etc.). Accordingly, low-power radio 248 may use one or more short-range wireless communication techniques to send and/or receive signals. For example, low-power radio 248 may use a sub-GHz frequency band, such as the 900 MHz or the 400 MHz band to transmit low-powered signals. In various other examples, low-power radio 248 may be a Bluetooth® low energy (BLE) radio. Operation of low-power radio 248 is described in further detail below. In various other examples, camera device 120 may comprise a different component other than low-power radio 248 for communicating with auxiliary motion sensor 122a. For example, an optical communication component, an audio communication component, and/or a wired communication link may be used in various example embodiments.

Auxiliary motion sensor 122a is described in further detail below. In various examples, auxiliary motion sensor 122a may include additional components apart from what is shown. Additionally, in various examples, one or more components of auxiliary motion sensor 122a depicted in FIG. 2 may be omitted. Accordingly, the auxiliary motion sensor 122a depicted in FIG. 2 is provided by way of example only.

Auxiliary motion sensor 122a may comprise one or more processors 260, a battery 264, a motion sensor 262 (e.g., motion sensor electronics), and/or a low-powered radio 266. Although not depicted in FIG. 2, in various examples, auxiliary motion sensor 122a may comprise a computer-readable non-transitory memory effective to store instructions and/or other data. Battery 264 may be, for example, a lithium-ion battery, a nickel cadmium battery, or any other suitable type of battery. As previously described, motion sensor 262 may be any suitable type of motion sensor (e.g., a PIR sensor, microwave sensor, vibration sensor, etc.) effective to detect motion within field-of-view 222 (and within overlap region 230).

Auxiliary motion sensor 122a may comprise a low-power radio 266. In at least some examples, auxiliary motion sensor 122a may use low-power radio 266 to communicate with low-power radio 248 of camera device 120. In various examples, low-power radio 266 may have a relatively short range (e.g., <100 ft, <200 ft, <60 ft, etc.). Accordingly, low-power radio 266 may use one or more short-range wireless communication techniques to send and/or receive signals. For example, low-power radio 266 may use a sub-GHz frequency band, such as the 900 MHz or the 400 MHz band to transmit low-powered signals. In various other examples, low-power radio 266 may be a Bluetooth® low energy (BLE) radio. In various other examples, auxiliary motion sensor 122a may comprise a different component other than low-power radio 266 for communicating with camera device 120. For example, an optical communication component, an audio communication component, and/or a wired communication link may be used in various example embodiments.

In various examples, when auxiliary motion sensor 122a detects motion (e.g., when motion sensor 262 is triggered), processor 260 may be effective to control low-power radio 266 to begin transmitting a signal indicating that auxiliary motion sensor 122a is currently detected motion (e.g., that auxiliary motion sensor 122a is currently triggered). Camera device 120 may receive the signal using low-power radio 248. Upon receipt of the signal, camera device 120 may determine whether motion sensor 258 is similarly triggered. In the current example, camera device 120 may be configured such that both motion sensor 258 and motion sensor 262 (of auxiliary motion sensor 122a) detect motion prior to initiation of video capture by image sensor 250 of camera device 120. Accordingly, when camera device 120 receives the signal indicating that auxiliary motion sensor 122a is triggered, camera device 120 may determine whether or not motion sensor 258 is triggered. In various examples, camera device 120 may first determine whether or not motion sensor 258 is triggered and may then determine whether a signal has been received indicating that auxiliary motion sensor 122a is triggered. The order of motion detection between motion sensor 258 and motion sensor 262 may not be important. If motion sensor 258 is triggered during a time period in which low-power radio 248 is receiving a signal indicating that auxiliary motion sensor 122a is triggered, processor 242 of camera device 120 may control the image sensor 250 to begin capturing video data through a lens of camera device 120.

In various examples, activating low-power radio 248 to determine whether a "triggered" signal is being transmitted by one or more auxiliary motion sensors may consume power. Accordingly, there may be a desire to minimize the rate at which low-power radio 248 is activated (e.g., powered) to detect/receive incoming signals in order to maximize battery life. The rate at which low-power radio 248 is activated may sometimes be referred to herein as an "activation rate". Processor 242 may activate low-power radio 248 (or another communication component) by controlling low-power radio 248 to transition to an active receive state or mode. There may also be an interest in reducing the latency between a time at which motion occurs in the physical environment monitored by camera device 120 and a time at which camera device 120 begins capturing and/or streaming image data and/or video data in order to capture video of events that may be of interest to a user. Accordingly, various techniques are described herein for balancing these competing interests.

In one example, camera device 120 may be configured to intermittently activate low-power radio 248 at a first rate (e.g., every 0.25 s, 0.3 s, 0.5 s, 0.7 s, 1 s, or any other suitable time period) at a first activation rate to detect incoming signals from auxiliary motion sensors. Additionally, in some examples, camera device 120 may activate low-power radio 248 at a random and/or pseudorandom activation rate. The rate (e.g., the average time interval between consecutive activations of the low-power radio 248) may be tunable and may be configurable by a user, based on an acceptable level of latency for the user. The user may be able to tune the latency through a companion application, a web-based interface, a physical interface on video processing device 140, or through some other interface. For example, the user may issue a command to the camera device 120 through a companion application to reduce latency of image data capture. In response, a rate at which the low-powered radio 248 is activated to detect wireless signals may be increased. Additionally, in some examples, transmission by a triggered auxiliary motion sensor (e.g., by low-power radio 266) may be synchronized with the activation of low-power radio 248.

Upon detection of motion, an auxiliary motion sensor may begin transmitting a signal indicating that the auxiliary motion sensor has detected motion. Thereafter, camera device 120 may receive the signal transmitted by the auxiliary motion sensor when camera device 120 next activates its low-power radio 248. Accordingly, the maximum latency for initiation of video/image/audio capture should be equal to the activation period of the camera device 120's low-power radio 248. However, in some examples, to further reduce latency, camera device 120 may increase the activation rate of low-power radio 248 during a time period over which integrated motion sensor (e.g., motion sensor 258) of camera device 120 detects motion. The increased activation rate of low-power radio 248 may occur for a set amount of time (e.g., for 1 second, 5 seconds, 10 seconds, 0.5 seconds, etc.) or may occur for the duration of the time period during which integrated motion sensor 258 detects motion in the environment.

For example, prior to detection of motion, camera device 120 may power (e.g., activate) low-power radio 248 every 0.5 s. At time t=0, camera device 120 may power low-power radio. However, in the example, at time t=0, no signal from any auxiliary motion sensors may have been detected. Additionally, at time t=0 integrated motion sensor 258 may not detect any motion. Thereafter, at time t=0.15 s, integrated motion sensor 258 may detect motion. Similarly, at time t=0.15 s, motion sensor 262 of auxiliary motion sensor 122a may detect motion. In the example, auxiliary motion sensor 122a may power low-power radio 266 and may begin transmitting a signal indicating that auxiliary motion sensor 122a is triggered. Normally, camera device 120 would not power low-power radio 248 again until time t=0.5 s. However, because integrated motion sensor 258 has detected motion, processor 242 of camera device 120 may increase the rate at which low-power radio 248 is powered. For example, while motion sensor 258 detects motion, processor 242 may power low-power radio 248 every 0.1 s. Accordingly, low-power radio 248 may be powered at time t=0.25 s and may detect the triggered signal sent by low-power radio 266. Processor 242 may determine that both integrated motion sensor 258 and auxiliary motion sensor 122a have detected motion. Accordingly, processor 242 may control image sensor 250 to begin capturing image data and/or video data. Additionally, processor 242 may power audio electronics to begin capturing audio data. As described, using the above techniques, the latency between the time at which the motion sensors detect motion and the initiation of video/audio capture and/or streaming is significantly reduced. Additionally, power consumption of is conserved using the techniques described above, resulting in both low latency of video capture and increased battery life, for both camera device 120 and auxiliary motion sensor 122a.

Figure 3:
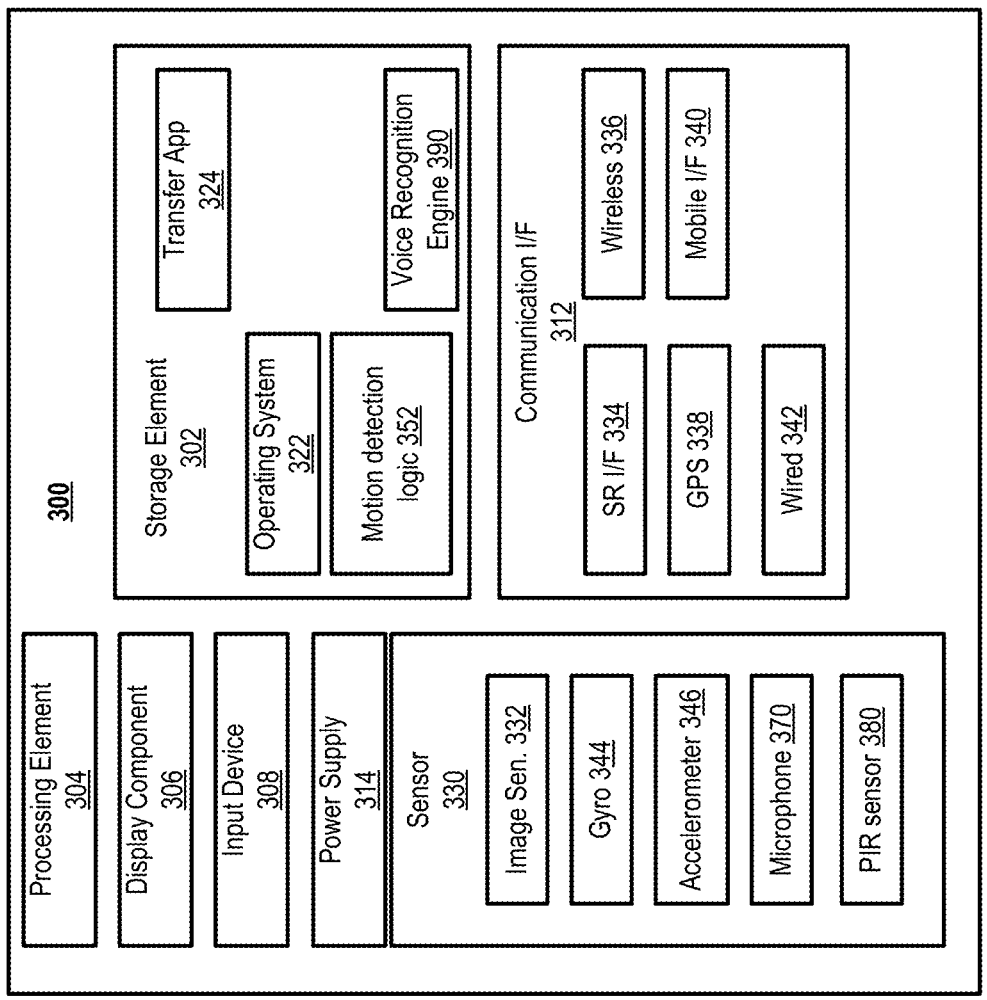
FIG. 3 is a block diagram showing an example architecture of a computing device that may be used in accordance with various aspects of the present disclosure.

FIG. 3 is a block diagram showing an example architecture 300 of a device, such as video processing device 140, camera device 120, auxiliary motion sensor 122a, and/or other devices described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., between one or more camera device 120 and video processing device 140 and/or between the camera device 120 and/or video processing device 140 and one or more remotely located computing devices). In some examples, the transfer application 324 may also be configured to upload the received images to another device that may perform processing as described herein (e.g., a mobile device or another computing device). Additionally, the transfer application 324 may be configured to send alerts and/or notifications to one or more mobile computing devices associated with the camera system depicted in FIG. 1. For example, an alert may be sent to a mobile device of a person associated with building 100 when one or more camera devices 120 and/or auxiliary motion sensors 122a, 122b, etc., have detected motion. The alert and/or notification may provide an option for a live stream of video and/or a portion of recorded video captured by one or more camera devices 120 that have detected motion.

In various examples, storage element 302 may store motion detection logic 352. Motion detection logic 352 may control initiation of video data capture, audio data capture, image data capture, and/or streaming of video data, image data, and/or audio data. In some examples, motion detection logic 352 may be hardwired (e.g., in an application specific integrated circuit (ASIC)), while in other examples, motion detection logic 352 may be configurable either through computer executable instructions executed by processing element 304, a programmable circuit (e.g., a field-programmable gate array (FPGA)) or some combination thereof. In various examples, motion detection logic 352 may control which motion sensors are used to trigger the initiation of video capture, image capture, and/or audio capture, and/or of streaming video, audio, and/or image data. For example, a logical AND operation may be used to initiate streaming when both an integrated motion sensor and an auxiliary motion sensor detect motion.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands, and/or audio data (e.g., microphone 259 depicted in FIG. 2). Voice recognition engine 390 may interpret audio signals of sound captured by microphone 370. In some examples, voice recognition engine 390 may listen for a "wake word" to be received by microphone 370. Upon receipt of the wake word, voice recognition engine 390 may stream audio to a voice recognition server for analysis. In various examples, voice recognition engine 390 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network according to any suitable wireless protocol, such as IEEE 802.11 or another suitable wireless local area network (WLAN) protocol. A short range interface 334 may be configured to communicate using one or more short range wireless protocols such as, for example, near field communication (NFC), Bluetooth, BLE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. In various examples, the camera device 120 described above in reference to FIGS. 1 and 2 may include one or more image sensors (e.g., image sensor 250 in FIG. 2). Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344, PIR sensors 380, and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

Figure 4:
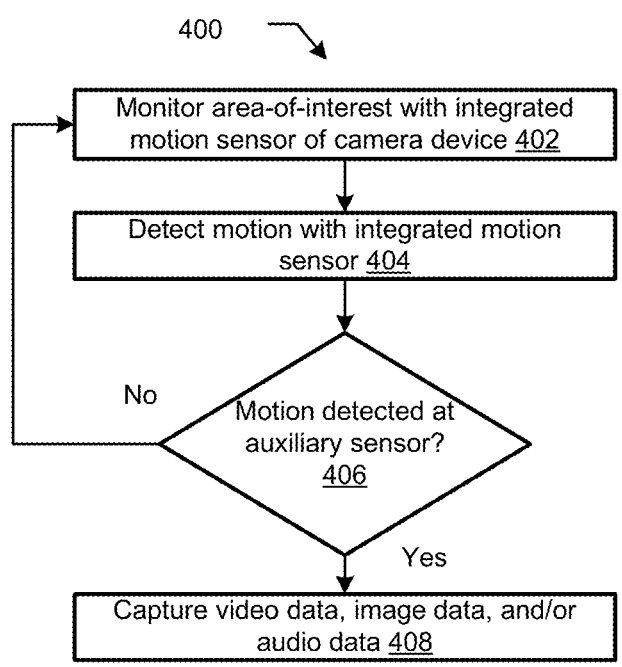
FIG. 4 depicts an example process that may be used to determine whether to initiate capture of video data, image data, and/or audio data, in accordance with various embodiments of the present disclosure.

FIG. 4 depicts an example process 400 that may be used to determine whether to initiate capture of video data, image data, and/or audio data, in accordance with various embodiments of the present disclosure. The actions of the process 400 may represent a series of instructions comprising computer readable machine code executable by a processing unit of a computing device, such as by processor 242 of camera device 120. In various examples, the computer readable machine codes may be comprised of instructions selected from a native instruction set of the computing device and/or an operating system of the computing device.

Process 400 may begin at action 402, "Monitor area-of-interest with integrated motion sensor of camera device". At action 402, an integrated motion sensor (e.g., a motion sensor within a housing of a camera device) may be used to monitor an area-of-interest to detect motion in the area-of-interest. For example, a camera device such as camera device 120 may be positioned by a user so as to monitor an entranceway into the user's home. Accordingly, a field-of-view of a motion sensor of the camera device 120 may monitor the entranceway into the user's home.

Process 400 may continue from action 402 to action 404, "Detect motion with integrated motion sensor". At action 404, motion may be detected by the integrated motion sensor of the camera device. For example, a person may walk through the entranceway to the user's home. The integrated motion sensor of the camera device may detect the movement of the person. In another example, a plant within the field-of-view of the motion sensor may be blown by wind. The integrated motion sensor of the camera device may detect the movement of the plant.

Process 400 may continue from action 404 to action 406 at which a determination may be made by the camera device (or some other computing device) whether motion has been detected at an auxiliary sensor. Accordingly, as described above, the camera device (e.g., camera device 120) may supply power to a short-range wireless communication radio to determine whether an auxiliary motion sensor is transmitting a signal indicating that motion has been detected. As previously described, the camera device may periodically or semi-periodically power the short-range wireless communication radio. Upon detection of motion the camera device may increase the rate at which the short-range wireless communication radio is powered.

If a determination is made at action 406 that no motion has been detected by the auxiliary sensor (e.g., because no signal has been received from the auxiliary motion sensor), processing may return to action 402. However, if at action 406 motion is detected by the auxiliary motion sensor, the auxiliary motion sensor may be configured to transmit a signal indicating that the auxiliary motion sensor has detected motion within a field-of-view of the auxiliary motion sensor. In various examples, the field-of-view of the auxiliary motion sensor may differ from the field-of-view of the integrated motion sensor of the camera device in order to prevent insignificant motion from triggering video, image, and/or audio capture. However, the field-of-view of the auxiliary motion sensor may also monitor all or a portion of the area-of-interest (e.g., the entranceway to the user's home, in the above example). The camera device may detect the transmitted data signal indicative of motion sent by the auxiliary motion sensor using a short-range wireless communication radio of the camera device. In at least some examples, the camera device may be operable to determine whether the data signal indicating motion received from the auxiliary motion sensor corresponds to data indicative of motion generated by the integrated motion sensor of the camera device. For example, the data signal indicative of motion may include a timestamp or other data indicating a time at which the auxiliary motion sensor detected motion. In some examples, the camera device may determine whether the auxiliary motion sensor detected motion at a time at which the integrated motion sensor of the camera device has also detected motion. In some examples, this determination may be made using timestamp data. In other examples, the camera device may determine, upon receipt of a data signal indicative of motion from the auxiliary motion sensor, whether the integrated motion sensor is currently, or has recently (e.g., within 0.1 s, or some other suitable timespan) detected motion in the area-of-interest. In other words, the camera device may determine whether data indicative of motion received from an auxiliary motion sensor temporally corresponds to data indicative of motion detected by an integrated motion sensor (or by another auxiliary motion sensor). In some examples, temporal correspondence may indicate that motion has been detected by at least two motion sensors at the same time, during the same timeframe, and/or within a threshold amount of time of each other. In various examples, temporal correspondence may be determined based on timestamp data included with signals indicative of detected motion. In various other examples, a camera device may determine whether signal data indicative of motion detected by an auxiliary motion sensor is received at a time at which an integrated motion sensor of the camera device is currently detecting motion (e.g., a Boolean AND operation) in order to determine temporal correspondence between the indications of motion.

In the current example, if both the integrated motion sensor and the auxiliary motion sensor have detected motion, processing may continue to action 408, "Capture video data, image data, and/or audio data". At action 408, electronics of the camera device may be powered such that the camera device begins capturing, storing, processing, and/or streaming video data, image data, and/or audio data. For example, an image sensor of the camera device and/or audio electronics of the camera device may be powered at action 408.

Although in the examples above, the integrated motion sensor first detects motion followed by the auxiliary motion sensor, it should be appreciated that in various examples, the auxiliary motion sensor may first detect motion followed by the integrated motion sensor. Additionally, motion may be detected by the integrated and auxiliary motion sensors at approximately the same moment in time.

Figure 5:
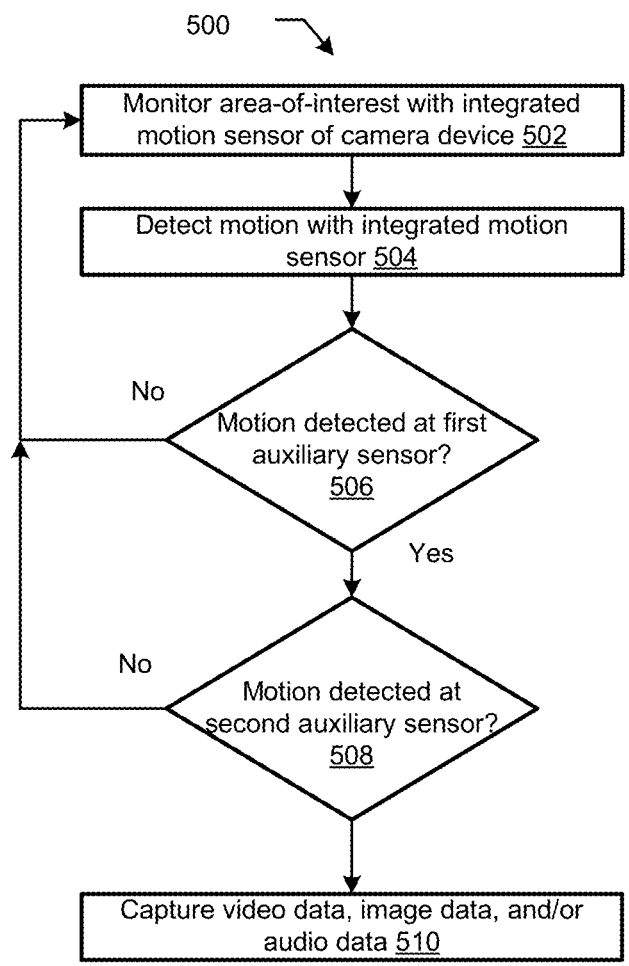
FIG. 5 depicts another example process that may be used to determine whether to initiate capture of video data, image data, and/or audio data, in accordance with various embodiments of the present disclosure.

FIG. 5 depicts an example process 500 that may be used to determine whether to initiate capture of video data, image data, and/or audio data, in accordance with various embodiments of the present disclosure. The actions of the process 500 may represent a series of instructions comprising computer readable machine code executable by a processing unit of a computing device, such as by processor 242 of camera device 120. In various examples, the computer readable machine codes may be comprised of instructions selected from a native instruction set of the computing device and/or an operating system of the computing device. In the example process 500, the motion detected by an integrated motion sensor of a camera device is corroborated by two auxiliary motion sensors. It should be appreciated that any number of motion sensors may be used in accordance with the present disclosure. Additionally, in examples where multiple motion sensors are used, camera devices may be configured such that less than all of the motion sensors detect motion in order to trigger initiation of video, audio, image data capture. For example, a system may include a camera device with an integrated motion sensor and two auxiliary motion sensors. The camera device may be configured to initiate video capture when any two of the three motion sensors have detected motion. In another example configuration, the camera device may be configured to initiate video capture when all three motion sensors detect motion, etc.

Process 500 may begin at action 502, "Monitor area-of-interest with integrated motion sensor of camera device". At action 502, an integrated motion sensor (e.g., a motion sensor within a housing of a camera device) may be used to monitor an area-of-interest to detect motion in the area-of-interest. For example, a camera device such as camera device 120 may be positioned by a user so as to monitor an entranceway into the user's home. Accordingly, a field-of-view of a motion sensor of the camera device 120 may monitor the entranceway into the user's home.

Process 500 may continue from action 502 to action 504, "Detect motion with integrated motion sensor". At action 504, motion may be detected by the integrated motion sensor of the camera device. For example, a person may walk through the entranceway to the user's home. The integrated motion sensor of the camera device may detect the movement of the person. In another example, a plant within the field-of-view of the motion sensor may be blown by wind. The integrated motion sensor of the camera device may detect the movement of the plant.

Process 500 may continue from action 504 to action 506 at which a determination may be made by the camera device (or some other computing device) whether motion has been detected at a first auxiliary sensor. Accordingly, as described above, the camera device (e.g., camera device 120) may supply power to a short-range wireless communication radio to determine whether a first auxiliary motion sensor is transmitting a signal indicating that motion has been detected. As previously described, the camera device may periodically or semi-periodically power the short-range wireless communication radio. Upon detection of motion the camera device may increase the rate at which the short-range wireless communication radio is powered.

If a determination is made at action 506 that no motion has been detected by the first auxiliary sensor (e.g., because no signal has been received from the first auxiliary motion sensor), processing may return to action 502. If a determination is made at action 506 that motion has been detected by the first auxiliary sensor, processing may continue to action 508.

At action 508, a determination may be made whether motion has been detected at a second auxiliary sensor. Accordingly, as described above, the camera device (e.g., camera device 120) may supply power to a short-range wireless communication radio to determine whether a second auxiliary motion sensor is transmitting a signal indicating that motion has been detected. As previously described, the camera device may periodically or semi-periodically power the short-range wireless communication radio. Upon detection of motion the camera device may increase the rate at which the short-range wireless communication radio is powered.

Although in the examples above, the integrated motion sensor first detects motion followed by the first and second auxiliary motion sensors, it should be appreciated that in various examples, motion may be detected by the various sensors in any order to trigger capture of video, audio and/or image data at action 510. For example, the first and/or second auxiliary motion sensors may first detect motion followed by the integrated motion sensor. Additionally, motion may be detected by the integrated and auxiliary motion sensors at approximately the same moment in time.

In the current example, if a determination is made at action 508 that no motion has been detected by the second auxiliary sensor (e.g., because no signal has been received from the second auxiliary motion sensor), processing may return to action 502. However, if the integrated motion sensor, the first auxiliary motion sensor, and the second auxiliary motion sensor have detected motion, processing may continue to action 510, "Capture video data, image data, and/or audio data". At action 510, electronics of the camera device may be powered such that the camera device begins capturing, storing, processing, and/or streaming video data, image data, and/or audio data. For example, an image sensor of the camera device and/or audio electronics of the camera device may be powered at action 510.

Figure 6:
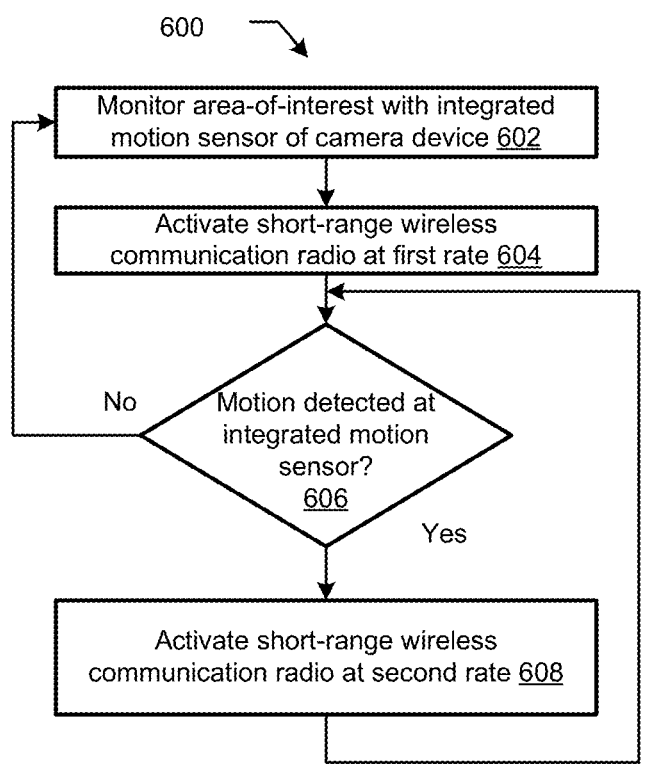
FIG. 6 depicts an example process that may be used to control a short-range wireless communication radio of a camera device, in accordance with embodiments of the present disclosure.

FIG. 6 depicts an example process 600 that may be used to control a short-range wireless communication radio of a camera device, in accordance with embodiments of the present disclosure. The actions of the process 600 may represent a series of instructions comprising computer readable machine code executable by a processing unit of a computing device, such as by processor 242 of camera device 120. In various examples, the computer readable machine codes may be comprised of instructions selected from a native instruction set of the computing device and/or an operating system of the computing device.

Process 600 may begin at action 602, "Monitor area-of-interest with integrated motion sensor of camera device". At action 602, an integrated motion sensor (e.g., a motion sensor within a housing of a camera device) may be used to monitor an area-of-interest to detect motion in the area-of-interest. For example, a camera device such as camera device 120 may be positioned by a user so as to monitor an entranceway into the user's home. Accordingly, a field-of-view of a motion sensor of the camera device 120 may monitor the entranceway into the user's home.

Process 600 may continue from action 602 to action 604, "Activate short-range wireless communication radio at first rate". At action 604, a processor of the camera device may control the activation of a short-range wireless communication radio (e.g., low-power radio 248) to detect wireless signals at a first activation rate. In some examples, the processor may be effective to activate the short-range wireless communication radio at a default rate. In other examples, a user of the camera device may program the rate. In various examples, the first activation may comprise activating the short-range wireless communication radio every 0.5 s, every 0.25 s, every 0.15 s, or any other suitable amount of time (e.g., pseudo-randomly).

Process 600 may continue from action 604 to action 606, at which a determination may be made whether motion has been detected by an integrated motion sensor of the camera device. If no motion has been detected by an integrated motion sensor of the camera device, process 600 may return to action 602. If motion has been detected by the integrated motion sensor of the camera device, process 600 may continue from action 606 to action 608, "Activate short-range wireless communication radio at second rate". In various examples, the second activation rate may be greater than the first activation rate. In other words, the processor of the camera device may increase a rate of activation of the short-range wireless communication radio to check more often to determine whether or not one or more auxiliary motion sensors are transmitting signals indicating that the auxiliary motion sensors have also detected motion. As shown in FIG. 6, the short-range wireless communication radio may be activated at the second rate while motion is detected at the integrated motion sensor. In at least some other examples, the short-range wireless communication radio may be activated at the second rate for a particular amount of time (e.g., 2 seconds, 5 seconds, or any other suitable amount of time).

Among other potential benefits, a system in accordance with the present disclosure may conserve power consumption by reducing video capture, image capture, and/or streaming from wireless camera devices resulting from insignificant motion that is unlikely to be of interest to a user. For example, detection of motion by a motion sensor of a battery-powered camera device may be used to trigger video capture by the camera device. However, as described herein, motion sensors may be triggered by insignificant motion, such as ceiling fans, pets, wind blowing various objects, passing cars, etc. Accordingly, the battery of a battery-powered camera device may be drained at an increased rate due to capture of such insignificant events. Additionally, unwanted notifications may be sent to a user of the camera system related to the insignificant motion triggers. Accordingly, as described herein, one or more auxiliary motion sensors with differing fields-of-view relative to one another and/or relative to an integrated motion sensor of a camera device may be used to reduce unwanted video capture and/or streaming. The techniques described herein may result in significantly longer battery life of wireless camera devices.

Additionally, various techniques are described herein to minimize power consumption of camera devices while also minimizing the latency between a time at which motion is detected and a time at which capture of video data and/or image data by an image sensor of the camera device is initiated. For example, a low-powered radio of a camera device may normally be powered at a first rate to detect signals indicating motion that are transmitted by one or more auxiliary motion sensors. However, upon detection of motion by an integrated motion sensor of the camera device and/or by a first auxiliary motion sensor, the camera device may increase the first rate (i.e., the camera device may power the low-powered radio more often) to detect signals from one or more auxiliary motion sensors. By increasing the rate at which the low-powered radio is activated when motion has been detected by a first motion sensor, the increase in power consumption may be limited to those times at which motion has been detected. Further, by increasing the rate at which the low-powered radio is activated when motion has been detected by a first motion sensor, latency of video capture, audio capture, and/or image capture may be reduced.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A security system comprising:
   a camera including a first passive infrared (PIR) sensor and an image sensor, the image sensor having a first field-of-view (FOV) and the first PIR sensor having a second FOV;
   a second PIR sensor separate from the camera, the second PIR sensor having a third FOV different from the second FOV, wherein the third FOV partially overlaps with the second FOV; and
   at least one processor communicatively coupled to the camera and the second PIR sensor, wherein the at least one processor is operable to:
     determine that the first PIR sensor detects motion during a first timeframe;
     determine that the second PIR sensor does not detect motion during the first timeframe;
     determine that the first PIR sensor detects motion during a second timeframe;
     determine that the second PIR sensor detects motion during the second timeframe;
     activate the image sensor to capture video data in response to the determining that the first PIR sensor detects motion during the second timeframe and the determining that the second PIR sensor detects motion during the second timeframe;
     determine that the first PIR sensor detects motion during a predetermined first time of day;
     determine that, during the predetermined first time of day, activation of the image sensor to capture second video data is triggered by detection of motion by the first PIR sensor while the second PIR sensor is not detecting motion; and
     activate the image sensor to capture the second video data in response to the first PIR sensor detecting motion during the first time of day.

2. The security system of claim 1, wherein the at least one processor is further operable to:
   prior to the first timeframe, activating a short-range wireless communication radio of the camera to receive wireless signals from the second PIR sensor at a first activation rate; and
   in response to the first PIR sensor detecting motion during the first timeframe, activating the short-range wireless communication radio at a second activation rate greater than the first activation rate, wherein the short-range wireless communication radio is activated at the second activation rate for a duration of a time period over which the motion is detected by the first PIR sensor.

3. A method of operating a camera, comprising:
   receiving first data indicative of motion from a first motion sensor, wherein the first motion sensor has a first field-of-view;

receiving, from a second motion sensor, second data indicative of motion, wherein the second motion sensor has a second field-of-view different than the first field-of-view;

determining that the first data indicative of motion temporally corresponds to the second data indicative of motion;

in response to the determining that the first data indicative of motion temporally corresponds to the second data indicative of motion, capturing first image data by an image sensor of the camera;

determining that the first motion sensor detects motion during a predetermined first time of day;

determining that, during the predetermined first time of day, activation of the image sensor to capture second image data is triggered by detection of motion by the first motion sensor while the second motion sensor is not detecting motion; and activating the image sensor to capture the second image data based at least in part on the first motion sensor detecting motion during the first time of day.

4. The method of claim 3, further comprising:

receiving, at a first time after capturing the first image data, third data indicative of motion from the first motion sensor;

determining that no signal has been received from the second motion sensor at the first time; and in response to the determining that no signal has been received from the second motion sensor at the first time, maintaining the image sensor of the camera in an inactive state such that image data is not captured by the image sensor.

5. The method of claim 3, further comprising:

prior to the receiving the first data indicative of motion, intermittently activating a short-range wireless communication radio of the camera to receive wireless signals from the second PIR sensor at a first rate; and in response to receiving the first data indicative of motion, intermittently activating the short-range wireless communication radio to receive wireless signals from the second PIR sensor at a second rate, wherein the second rate is greater than the first rate, wherein the second data indicative of motion is received by the short-range wireless communication radio while the short-range wireless communication radio is being activated at the second rate, and wherein the capturing the first image data by the image sensor is based at least in part on the first data indicative of motion and the second data indicative of motion.

6. The method of claim 5, further comprising intermittently activating the short-range wireless communication radio at the second rate until at least one of: the first motion sensor no longer detects any motion or the second data indicative of motion is received.

7. The method of claim 5, further comprising:

intermittently activating the short-range wireless communication radio at the second rate for a first amount of time; and after the first amount of time has elapsed, intermittently activating the short-range wireless communication radio of the camera at the first rate.

8. The method of claim 3, further comprising:

receiving, at a first time after capturing the first image data, third data indicative of motion from the first motion sensor;

determining, by the camera, that no signal has been received from the second motion sensor at the first time;

receiving, by the camera from a third motion sensor, fourth data indicative of motion, wherein the third motion sensor has a third field-of-view different from and overlapping with the first field-of-view and the second field-of-view; and capturing, in response to the third data and the fourth data, second image data by the image sensor of the camera.

9. The method of claim 3, further comprising, prior to the receiving the first data indicative of motion:

intermittently activating a short-range wireless communication radio of the camera at a first rate;

receiving a command effective to reduce a latency of image data capture upon detection of motion; and intermittently activating the short-range wireless communication radio of the camera at a second rate, wherein the second rate is greater than the first rate.

10. The method of claim 3, further comprising synchronizing a first rate at which the second data is sent by the second motion sensor with a second rate at which a radio of the camera is activated to detect wireless signals.

11. A system comprising:

a first motion sensor having a first field-of-view;

a second motion sensor having a second field-of-view different than the first field-of-view; and a camera comprising an image sensor, the camera effective to:

receive, from the first motion sensor, a first data indicative of motion;

receive, from the second motion sensor, second data indicative of motion;

determine that the first data indicative of motion temporally corresponds to the second data indicative of motion;

capture first image data by the image sensor;

determine that the first motion sensor detects motion during a predetermined first time of day;

determine that, during the predetermined first time of day, activation of the image sensor to capture second image data is triggered by detection of motion by the first motion sensor while the second motion sensor is not detecting motion; and activate the image sensor to capture second image data based at least in part on the first motion sensor detecting motion during the first time of day.

12. The system of claim 11, wherein the first motion sensor is integrated within a housing of the camera, and wherein the second motion sensor is configured in communication with the camera via a short-range wireless communication radio.

13. The system of claim 11, wherein the camera is further effective to:

receive, at a first time after capturing the first image data, third data indicative of motion from the first motion sensor; and determine that no signal has been received from the second motion sensor at the first time; and in response to the determining that no signal has been received from the second motion sensor at the first time, maintain the image sensor in an inactive state such that image data is not captured by the image sensor.

14. The system of claim 11, wherein the camera is further effective to:

prior to receiving the first data indicative of motion, intermittently activating a short-range wireless communication radio of the camera at a first rate; and in response to receiving the first data indicative of motion, intermittently activating the short-range wireless communication radio at a second rate, wherein the second rate is greater than the first rate, wherein the second data indicative of motion is received by the short-range wireless communication radio from the second motion sensor while the short-range wireless communication radio is being activated at the second rate, and wherein the capturing the first image data by the image sensor is based at least in part on the first data indicative of motion and the second data indicative of motion.

15. The system of claim 14, wherein the camera is further effective to intermittently activate the short-range wireless communication radio at the second rate until at least one of: the first motion sensor no longer detects any motion or the second data indicative of motion is received.

16. The system of claim 14, wherein the camera is further effective to:

intermittently activate the short-range wireless communication radio at the second rate for a first amount of time; and after the first amount of time has elapsed, intermittently activate the short-range wireless communication radio at the first rate.

17. The system of claim 11, further comprising a third motion sensor having a third field-of-view different from and overlapping with the first field-of-view and the second field-of-view, wherein the camera is further effective to:

receive, at a first time after capturing the first image data, third data indicative of motion from the first motion sensor;

determine that no signal has been received from the second motion sensor at the first time;

receive, from the third motion sensor, fourth data indicative of motion; and capture, in response to the third data and the fourth data, second image data by the image sensor.

\* \* \* \* \*